(12) United States Patent
Kim et al.

(10) Patent No.: US 7,693,643 B2
(45) Date of Patent: Apr. 6, 2010

(54) FAULT DETECTION SYSTEM AND METHOD FOR TURBINE ENGINE FUEL SYSTEMS

(75) Inventors: Kyusung Kim, Plymouth, MN (US); Onder Uluyol, Fridley, MN (US); Charles M. Ball, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 624 days.

(21) Appl. No.: 11/058,061

(22) Filed: Feb. 14, 2005

(65) Prior Publication Data

US 2006/0195248 A1   Aug. 31, 2006

(51) Int. Cl.
G06F 19/00   (2006.01)
F02C 7/26   (2006.01)

(52) U.S. Cl. .................. 701/100; 701/29; 60/778; 60/786

(58) Field of Classification Search .............. 701/3, 701/7, 9, 14–16, 100, 113, 110, 29; 123/406.16; 703/7; 714/745; 73/118.1, 35.03, 35.04, 73/35.06, 117.3, 117.2, 117.4; 60/778, 786, 60/800

See application file for complete search history.

(56) References Cited

U.S. PATENT DOCUMENTS

| | | | |
|---|---|---|---|
| 3,902,315 A | | 9/1975 | Martin |
| 4,215,412 A | * | 7/1980 | Bernier et al. .............. 701/100 |
| 4,350,008 A | * | 9/1982 | Zickwolf, Jr. ............. 60/39.281 |
| 4,488,240 A | * | 12/1984 | Kapadia et al. ................ 702/56 |
| 4,891,971 A | | 1/1990 | Jones et al. |
| 5,107,674 A | | 4/1992 | Wibbelsman et al. |
| 5,436,826 A | | 7/1995 | O'Flarity |
| 5,483,936 A | * | 1/1996 | Kerstein et al. ........ 123/406.16 |
| 5,718,111 A | | 2/1998 | Ling et al. |
| 5,916,126 A | | 6/1999 | Szillat et al. |
| 6,470,258 B1 | | 10/2002 | Leamy et al. |
| 6,498,978 B2 | | 12/2002 | Leamy et al. |
| 6,502,085 B1 | * | 12/2002 | Adibhatla et al. ............. 706/52 |
| 6,539,783 B1 | * | 4/2003 | Adibhatla ................... 73/118.1 |
| 6,598,195 B1 | * | 7/2003 | Adibhatla et al. ........... 714/745 |
| 7,003,426 B2 | * | 2/2006 | Bonanni et al. ............. 702/138 |
| 7,020,595 B1 | * | 3/2006 | Adibhatla et al. .............. 703/7 |

* cited by examiner

*Primary Examiner*—Khoi H. Tran
*Assistant Examiner*—Ronnie Mancho
(74) *Attorney, Agent, or Firm*—Ingrassia Fisher & Lorenz, P.C.

(57) ABSTRACT

A system and method is provided that facilitates improved fault detection. The fault detection system provides the ability to detect symptoms of fault in the fuel system of a turbine engine. The fault detection system captures selected data from the turbine engines that is used to characterize the performance of the fuel system. The fault detection system includes a feature extractor that extracts salient features from the selected sensor data. The extracted salient features are passed to a classifier that analyzes the extracted salient features to determine if a fault is occurring or has occurred in the turbine engine fuel system. Detected faults can then be passed to a diagnostic system where they can be passed as appropriate to maintenance personnel.

13 Claims, 10 Drawing Sheets

| CONDITION | PARAMETERS | | | | |
|---|---|---|---|---|---|
|  | TIME | N2 | EGT | N2 DOT | EGT DOT |
| STARTER ON |  |  |  |  |  |
| LIGHT OFF | ■ | ■ |  |  | ■ |
| PEAK EGT DOT | ■ | ■ | ■ |  |  |
| START OF 3RD PHASE |  | ■ |  | ■ | ■ |
| PEAK EGT |  |  |  |  |  |
| IDLE SPEED |  |  |  |  |  |

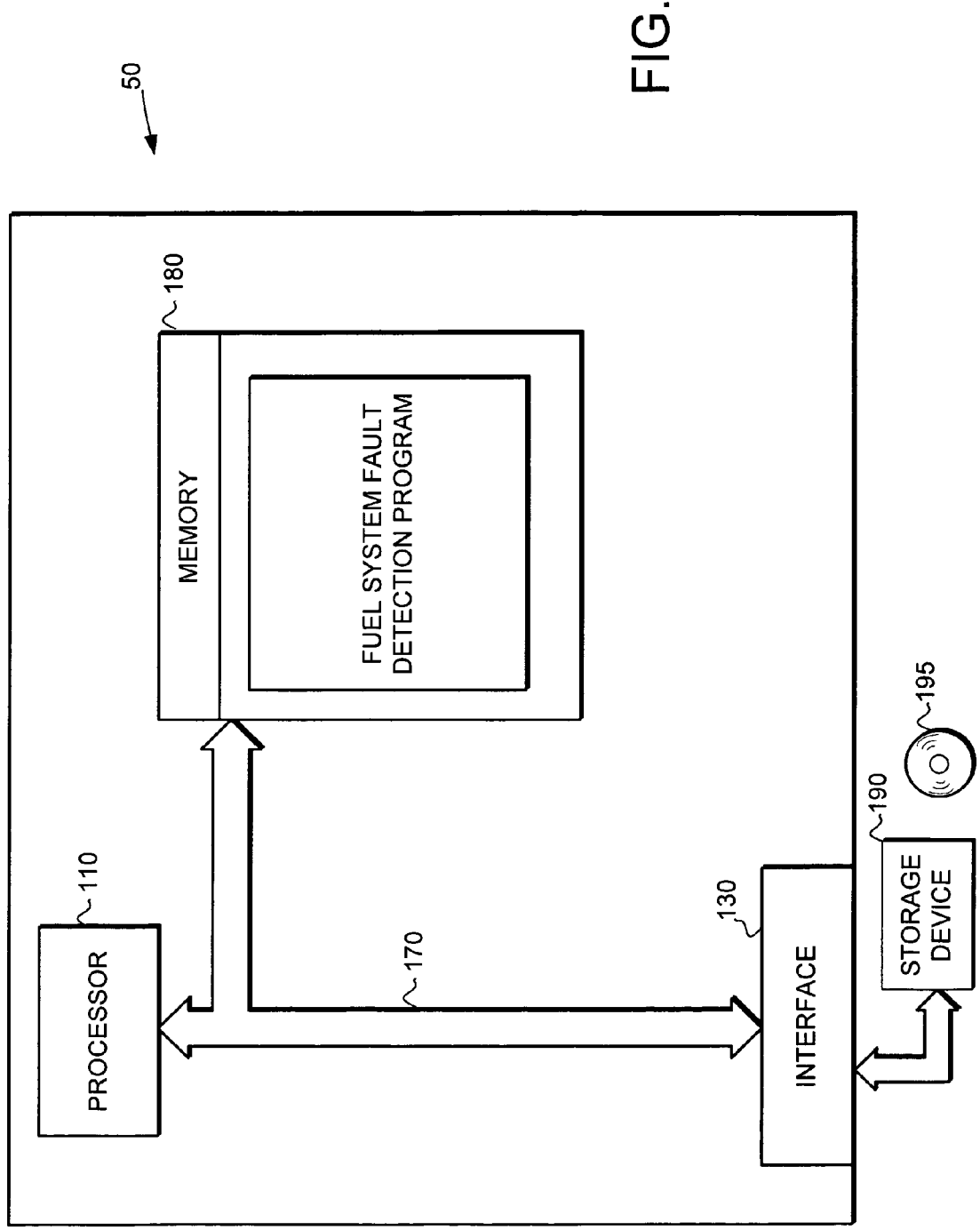

FAULT DETECTION SYSTEM AND METHOD FOR TURBINE ENGINE FUEL SYSTEMS

FIELD OF THE INVENTION

This invention generally relates to diagnostic systems, and more specifically relates to fault detection in turbine engines.

BACKGROUND OF THE INVENTION

Modem aircraft are increasingly complex. The complexities of these aircraft have led to an increasing need for automated fault detection systems. These fault detection systems are designed to monitor the various systems of the aircraft in an effect to detect potential faults. These systems are designed to detect these potential faults such that the potential faults can be addressed before the potential faults lead to serious system failure and possible in-flight shutdowns, take-off aborts, and delays or cancellations.

Engines are, of course, a particularly critical part of the aircraft. As such fault detection for aircraft engines are an important part of an aircrafts fault detection system. One problem with fault detection in turbine engines has been the large amounts of data typically required to fully analyze the performance of the turbine engine. In many cases such large amounts of data are not available from the engine or cannot be reasonably stored and passed to the fault detection system due to limitations in hardware. For example, smaller turbine engines may be limited data sensors and recording ability. This has limited the ability to perform effective fault detection in some applications.

This issue is particularly relevant for fault detection in the fuel system of turbine engines. The proper delivery of fuel is critical to the operation of a turbine engine and as such a failure in the fuel system will commonly lead to failure of the turbine engine. It is thus desirable to closely monitor the operation of the fuel system for fault detection, diagnosis and prognosis. Unfortunately, previous methods of fault detection in fuel systems of turbine engines have been limited in effectiveness.

BRIEF SUMMARY OF THE INVENTION

The present invention provides a fault detection system and method that provides improved fault detection. The fault detection system provides the ability to detect symptoms of fault in the fuel system of a turbine engine. Turbine sensor data that is indicative of the anomalies of interest is identified and collected. This indicative set of data is collected and used to characterize the performance of the fuel system. The fault detection system includes a feature extractor that extracts salient features from the selected sensor data. The extracted salient features are passed to a classifier that analyzes the extracted salient features to determine if a fault is occurring or has occurred in the turbine engine fuel system. Detected faults can then be passed to a diagnostic system where they can be passed as appropriate to maintenance personnel.

The fault detection system and method is particularly applicable to faults that occur in the hydro-mechanical assembly (HMA) of the turbine engine. For this application a statistical analysis has been applied to identify a specific subset of sensor data parameters that are highly indicative of HMA anomalies. The fault detection system monitors turbine engine sensor data during engine startup and collects the specified subset of data. This subset of sensor data is passed to the feature extractor. The feature extractor extracts salient features from the set of turbine engine sensor data. This extraction reduces the original subset of turbine sensor data into a substantially reduced set of variables, and the extracted features are passed to the classifier. The reduced set of variables in the extracted salient features allows the classifier to efficiently analyze the data for symptoms of HMA failure and accurately classify the performance of the turbine engine fuel system. Thus, the fault detection system provides improved fault detection for turbine engine fuel systems.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and:

FIG. 3 is a table of sensor data parameters selected from sensor data in an exemplary embodiment;

FIG. 10 is a schematic view of a computer system that includes a fuel system fault detection program.

DETAILED DESCRIPTION OF THE INVENTION

The present invention provides a fault detection system and method that provides improved fault detection. The fault detection system provides the ability to detect symptoms of fault in the fuel system of a turbine engine.

Figure 1:
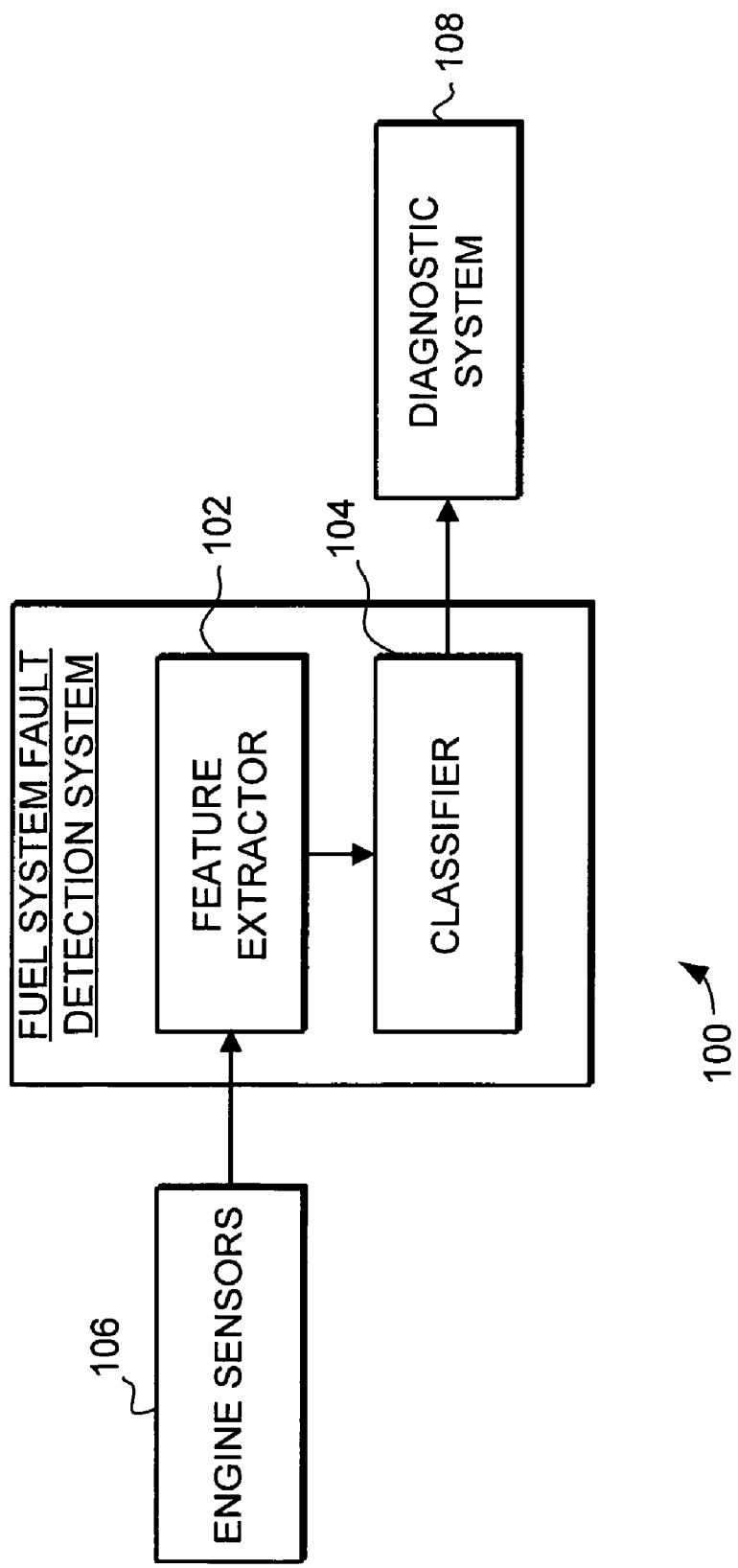
FIG. 1 is a schematic view of a fuel system fault detection system.

Turning now to FIG. 1, a fault detection system 100 for turbine engine fuel systems is illustrated. The fault detection system 100 includes a feature extractor 102 and a classifier 104. Turbine sensor data that is indicative of the anomalies of interest is identified and collected. This indicative set of turbine engine sensor data from the engine sensors 106 is passed to the feature extractor 102. The feature extractor 102 extracts salient features from the turbine engine sensor data. This extraction reduces the original turbine sensor data into a substantially reduced set of variables that can be used to efficiently detect problems in the fuel system. The extracted salient features are then passed to the classifier 104. The reduced set of variables in the extracted salient features allows the classifier 104 to efficiently analyze the data for symptoms of fuel system failure and accurately classify the performance of the turbine engine fuel system. The results of the classification are then passed to a diagnostic system 108, where they can be relayed to a user, or subject to further analysis.

The fault detection system 100 is particularly applicable to fuel system fault detection for faults that occur in the hydro-mechanical assembly (HMA) of the turbine engine. For this application a statistical analysis has been applied to identify a specific subset of sensor data parameters that are highly indicative of HMA anomalies. The fault detection system 100 monitors turbine engine sensor data during engine startup and collects the specified subset of data. This subset of sensor data is passed to the feature extractor 102. The feature extractor 102 extracts salient features from the set of turbine engine sensor data. This extraction reduces the original subset of turbine sensor data into a substantially reduced set of variables, and the extracted features are passed to the classifier 104. The reduced set of variables in the extracted salient features allows the classifier 104 to efficiently analyze the data for symptoms of HMA failure and accurately classify the performance of the turbine engine fuel system. Thus, the fault detection system 100 provides improved fault detection for turbine engine fuel systems. Again, detected faults can then be passed to a diagnostic system 108 where they can be passed as appropriate to maintenance personnel.

As described above, the system preferably uses specific subset of sensor data parameters that are highly indicative of the anomalies of interest in the fuel system. One method that can be used to identify combinations of sensor data that are indicative of anomalies in the fuel system is a statistical or correlation analysis of historical sensor data from both engines with good fuel systems and engines with fuel system anomalies. This analysis can be performed to identify the most indicative parameters for a particular failure mode.

As an example, such a process can be performed by first standardizing the historical sensor data. Since sensor data profiles may vary depending on ambient conditions it is desirable decouple the effects of the varying ambient conditions from the sensor data by standardizing or normalizing the sensor data. The next step in this process is to filter out data profiles that are from operations where underlying differences will result in data variations. For example, the data can be filtered by filtering out data from different types of turbine engine starts that would typically exhibit different startup profiles.

With the historical sensor data standardized and filtered it can be used to identify the portions of data that are most indicative of the anomaly interest. The use of a smaller subset of data can greatly reduce the data storage and processing requirements of the system. The indicative subsets of data can be identified by analyzing the statistical distributions of the various sensor parameters in the presence and absence of fuel system anomalies. For example, depending on the different type of fuel system anomalies, the engine speed during the startup could be accelerated faster or slower than normal and the temperature also could rise faster or slower than in the normal operation. Thus the mean and standard deviation of indicative subset of data would be much different in the presence of fuel supply system anomalies compared to those of the data in the absence of the anomalies. The identified subset sets of data will comprise the sensor data parameters that are collected and used for fault detection in the fuel system.

Specifically, during operation of the fault detection system the identified indicative sensor data parameters are collected and passed to the feature extractor 100. For example, a sensor data processor can be implemented to receive a stream of sensor data and collect those sensor data parameters that have been selected to use in the fault detection system. This sensor data is then passed to the feature extractor 100. The feature extractor 100 extracts salient features from the turbine engine sensor data. This extraction results in an additional reduction in the dimensionality of the input data. Feature extraction can include forming linear or nonlinear combinations of the original sensor data to generate new variables. The new variables extracted from the original sensor data comprise features, and the process of generating the features is in general called feature extraction.

In one embodiment, the feature extractor 100 performs a principal component analyses (PCA) on the engine sensor data to extract salient features from the engine sensor data. PCA is a feature extraction method that linearly transforms an original set of variables into a substantially smaller set of uncorrelated variables. The substantially smaller set of uncorrelated variables. represents the information in the original set of variables. The general goal of the dimension reduction is to achieve a more efficient combination of the original features.

As one detailed example of a PCA, it can be shown that the optimal linear solution for representing n-dimensional vectors X in an m-dimensional space, where m<n, is to project X onto the surface spanned by the m largest eigenvectors of the covariance matrix. By projecting onto the principal subspace, PCA minimizes the squared reconstruction error and maximizes the separation of data clusters.

In a particular example, let X denote an n-dimensional vector having zero mean. The linear feature extraction can be written as:

$$Y=F^T X \qquad \text{Equation 1.}$$

In which Y is an m-dimensional feature vector and F is an nxm matrix built from m orthogonal n-dimensional vectors. If the original n-dimensional feature space is linearly reconstructed from the extracted m-dimensional feature vectors, the approximation of the vector X can be written as:

$$\hat{X}=FY=FF^T X \qquad \text{Equation 2.}$$

The information lost in this projection, which is the measure of the performance of the feature extraction, can be written as:

$$MSE=E(|X-\hat{X}|^2) \qquad \text{Equation 3.}$$

In which E is the expectation operator. Since the vectors in F are orthogonal, it can be rewritten as:

$$MSE=E(X^T X - X^T F F^T X) \qquad \text{Equation 4.}$$

Minimizing the reconstruction error means rotating the orthogonal vectors in F to the directions of the largest variance. Therefore, PCA finds a projection onto a subspace spanned by the m largest eigenvectors of the covariance matrix. Geometrically, the first principal component is the axis of closest fit to the observations. Projecting the observations on this axis generates a new variable, and its variance is the maximum among all possible choices of this axis. The second principal component is another axis, perpendicular to the first axis. Projecting the observations on the second axis generates another new variable whose variance is the maximum among all possible choices of this second axis.

The selection of principal components generated from the sensor data can be done by a statistical analysis. Specifically, those components showing the most differentiable distributions when compared to the presence of failure and at the absence of failure are preferably selected. As discussed above the sensor data passed to the PCA is preferably that sensor data most indicative of the target failure mode. Because it is probable that the most indicative data is correlated to each other, the principal components generated from the liner transformation through PCA are not equally indicative of the target failure mode. By analyzing the statistical distribution of principal components obtained from the historical data, the principal components showing the most different values in the presence of anomalies can be identified. A specific example of the selection of principal components will be discussed in greater detail below.

PCA is thus one method of extracting salient features from the turbine engine sensor data, reducing the original turbine sensor data into a substantially reduced set of variables that can be used to efficiently detect fuel system problems. Of course, other systems and methods can also be used to extract features from the sensor data. For example, signal decomposition techniques such as wavelets and independent component analysis (ICA), or non-linear PCA techniques based on neural networks can also be used as a feature extractor. In each of these implementations, the feature extractor results in a reduced set of variables from the original sensor data. The reduced set of variables in the extracted salient features allows the classifier to efficiently analyze the data for symptoms of fuel system anomalies and accurately classify the performance of the turbine engine fuel system.

In one embodiment of the fault detection system 100 the classifier 104 comprises a fuzzy clustering system. Fuzzy clustering is one type of technique for classification of data points. In general fuzzy clustering identifies natural groupings of data from a large data set to produce a more concise representation of system behavior. When used for classification, fuzzy clustering assigns each data point to a cluster to some degree that is specified by a membership grade. Fuzzy clustering thus provides a method for grouping data points that populate some multidimensional space into a specific number of different clusters. From this grouping of data points into clusters the system is able to classify data points as they are received from the feature extractor.

One method for building a fuzzy clustering system is to train the system using exposure to real-time or historical data. Training typically starts with an initial guess for the cluster centers, which are intended to mark the mean location of each cluster. The initial guess for these cluster centers is most likely incorrect. Additionally, in training every data point in the training sets are assigned a membership grade for each cluster. By iteratively updating the cluster centers and the membership grades for each set of data points the training moves the cluster centers to the right location within a data set. This iteration is typically based on minimizing an objective function that represents the distance from any given data point set to a cluster center weighted by that data point sets membership grade.

When so trained the fuzzy clustering system is ready to classify new sensor data sets into clusters by membership grade. Thus, as new data points from the feature extractor are received the classifier assigns new set of sensor data to a cluster to a degree that is specified by a membership grade. From this classification the system is able to determine if the data point is indicative of future or current failure in the fuel system of the turbine engine.

Of course, fuzzy clustering is just one example of example of the type of systems that can be used to implement a classifier. Other examples of classifiers that can be used include neural networks, support vector machines (SVM) or Fisher's Discriminant Analysis, and probability based classifiers using the Bayesian approach. In a neural network based classifier a neural network is trained and used to classify the extracted salient features to determine whether or not a fault has occurred.

A variety of different types of sensor data can be used for fault detection in engine turbines. Examples of sensor data include temperature data, such as exhaust gas temperature (EGT), and engine speed data, such as core speed (N2) or fan speed (N1). As discussed above the sensor data that is selected for use in fault detection preferably comprises sensor data that is highly indicative of the anomalies of interest, while reducing the amount of sensor data that is collected and stored. In one implementation that will be discussed below, both EGT and core speed N2 will be used for fault detection in the HMA of the turbine engine fuel system.

Figure 2:
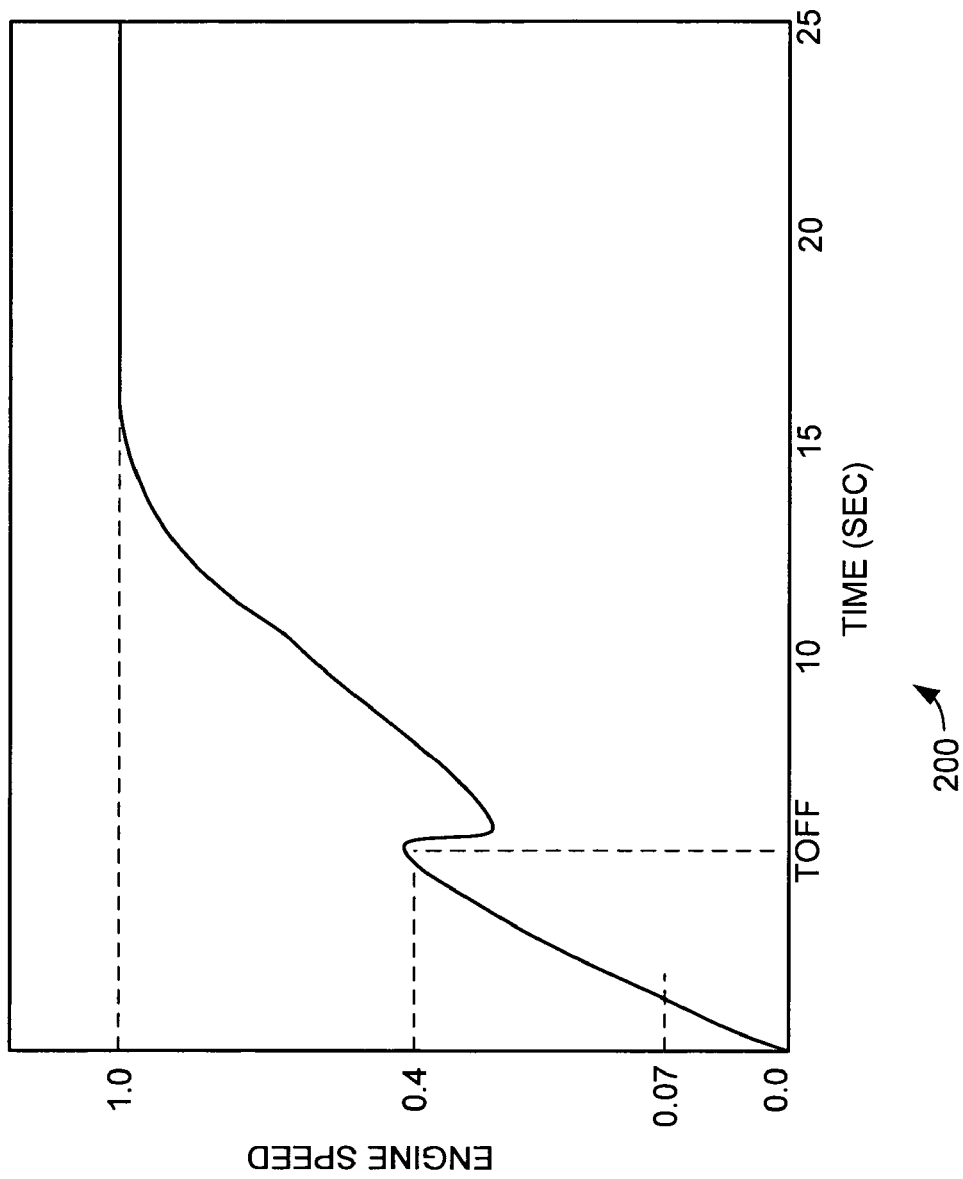
FIG. 2 is an exemplary plot of turbine engine speed during engine startup.

The sensor data used for fault detection of the fuel system can be taken from a variety of different operational conditions. In one particular application sensor data from engine startups are used for fault detection in the fuel system. Some types of faults in the fuel system have been found to manifest themselves during turbine engine startup. Other faults may manifest themselves during other transient conditions, such as during engine traverse from ground idle to max speed and from flight idle to cruise. Turning now to FIG. 2, a typical turbine engine speed plot during engine startup is illustrated. FIG. 2 illustrates engine speed (as a percentage of full engine speed) as a function of time from startup. The startup sequence proceeds as follows: The starter begins to rotate the engine compressor and the igniter is switched on, causing the igniter plugs to start firing. At about 7% (0.07) of full engine speed the igniter system is turned on. As the ignition system successfully completes light-off, the combustor is able to sustain combustion. The exhaust gas temperature (EGT) rises sharply at light-off. This rapid increase in EGT provides the indications that light-off has occurred. The engine starter continues to provide rotational torque to the engine as the engine speed continues to increase. The engine turbine then begins to provide rotational energy to the system. At about 40% engine speed, the starter system is shut off (time TOFF in FIG. 2). There is a momentary drop in engine speed, as seen in FIG. 2, due to the drop in rotational torque when the starter is shut off. The engine power section has then completely taken over responsibility for bringing the engine to full speed (or the required speed set point).

In order to provide effective fault detection it is desirable to select sensor data that is most indicative of faults in the fuel system. Additionally, it is generally desirable to limit the amount of sensor data needed for fault detection. This is especially important for older or smaller turbine engines that may have limited data collection and storage ability. As discussed above, some types of faults in the fuel system manifest themselves during transient conditions such as startup. Sensor data taken during engine startup can thus be used for fault detection of the fuel system.

In one embodiment data from six critical-to-characterization (CTC) conditions during startup are collected and used in fuel system fault detection. These six CTC conditions have been found to be particularly indicative of fuel system performance. These six conditions during engine startup include: (i) starter on; (ii) lightoff; (iii) maximum temperature gradient; (iv) start of $3^{rd}$ phase; (v) peak temperature; and (vi) idle speed. Sensor data associated with these six conditions have been found to be effective in characterizing the performance of the turbine engine fuel system. As such, data from these six conditions can be collected and used for fault detection in the fuel system. This provides the ability for effective fault detection while reducing the amount of data that needs to be collected and stored for fault detection.

In general, the starter on conditions occurs when the starter is turned on and begins to rotate the engine. Lightoff occurs when the ignition successfully completes and the combustor is able to sustain combustion, and the precise time of lightoff can be detected using the method disclosed in U.S. patent application Ser. No. entitled "System and Method for Lightoff Detection in Turbine Engines", filed May 26, 2004, Ser. No. 10/855,477. The maximum temperature gradient occurs when the engine temperature has its highest rate of change during startup. In one example this is the peak EGT temperature rate of change, sometimes referred to as "peak EGTdot". Start of $3^{rd}$ phase, also called phase change, starter-off or midway-to-idle, occurs when the starter motor is shut off, with the engine then rotating and engine speed continuing to increase under its own power. The power section then begins to provide rotational energy to the system. At about 40% engine speed, the starter system is shut off. Peak temperature occurs when the engine reaches its peak temperature during startup. When EGT temperature is used this is referred to as "peak EGT". Finally, idle occurs when the engine reaches its idle speed, typically defined as 50-51% of full engine speed.

In one implementation the fault detection system collects sensor data taken during these six conditions or a subset of these six conditions. That sensor data can then passed to a fault detection system to evaluate the performance of the engine during startup. Because only data from the six key conditions are required, the system provides fault detection with reduced data processing requirements.

One specific application of a fuel system fault detection system will now be discussed. In this application the fault detection system is implemented to detect faults in the hydromechanical assembly (HMA) of the fuel system. This implementation uses a subset of sensor data from the six critical-to-characterization (CTC) conditions that are highly indicative of HMA anomalies. This implementation uses thus statistical characteristic analysis for data reduction along with principal component analysis for feature extraction and fuzzy clustering for classification.

The fuel system on a turbine engine provides fuel to the engine for proper combustion under all operating conditions. The HMA is a major component of the fuel system. In a typical system fuel is supplied to the inlet side of the engine driven fuel boost pump where pressure is increased slightly. The fuel will then enter a fuel preheater portion of a fuel-oil heat exchanger, where the temperature of the fuel is maintained within certain limits. The heated fuel will then enter a main fuel filter and next flow into the high pressure fuel pump portion of the HMA. The HMA includes a fuel pumping unit and a hydro-mechanical metering unit. The hydro-mechanical metering unit includes the components necessary to provide metered fuel to the engine and control the air bleed actuator in both automatic and manual backup control. The HMA pumps out the high-pressure metered fuel into fuel divider which divides fuel in proportion to fuel flow to pilot and main fuel lines leading to the fuel manifolds and nozzles in the engine.

The HMA also includes a potentiometer that comprises a dual element position sensor that measures a power level actuator angle. The power level actuator sets the aircraft throttle position by comparing two different potentiometers and tow signals. The potentiometer degrades as it wears due to engine modal vibration. The overall effect of the potentiometer degradation is a variation in actual engine speed with commanded engine speed, often seen at startup and idle. Other failures related to the HMA are boost pump failure, heat exchanger problems, over-speed controller stick and flow divider failures. Depending on the type of the failures it can result in cold hung start, hot hung start, fuel leakages, hot starts, and/or high idle.

In the presence of an HMA fault, the engine speed and engine temperature will alter and thus sensor data will show different distributions from a baseline case. The embodiments of the present invention use a selected subset of the sensor data collected that is highly indicative of the anomalies of interest in the HMA.

Several techniques can be used to identify the data that is indicative of the HMA anomalies of interest. In this specific example the subset of data is identified using a statistical analysis of past sensor data from both engines with good fuel systems and engines with HMA anomalies. This would generally include first standardizing the sensor data to reduce the effects of varying ambient conditions. Since sensor data profiles may vary depending on ambient conditions it is desirable decouple the effects of the varying ambient conditions from the sensor data. For example, core engine speed (N2) and engine gas temperature (EGT) data can be corrected using corresponding ambient temperature data (TAT). The data is then filtered to remove data that has underlying operational differences that result in data variations. For example, a typical data set may include data from every startup of the turbine engine, including auto starts, manual starts, ground test starts, etc. These different start modes may exhibit different startup profiles. For example, the type of startup will effect the operation of the power level angle (PLA) position, which in turn governs the shape of engine speed and temperature profiles. Thus in this case it is desirable to remove sensor data from the starts where a different startup of type will change the data.

With the past sensor data standardized and filtered it can be used to identify the portions of data that are most indicative of the anomaly interest. The use of a smaller subset of data can greatly reduce the data storage and processing requirements of the system. In a typical turbine engine startup the engine startup time may take between 40 and 50 seconds. A large amount of sensor data can be collected during this time. For example, the engine speed and temperature data may be collected at a sampling rate of 4 Hz. Analyzing such a large set of data can be problematic. Collecting and analyzing only a subset of this data is desirable for several reasons. First, it can reduce the cost of data collection and storage. Second, it can result in faster data processing resulting in more timely prognostic decision making. Third, not all turbine engines have the ability to store large amounts of high speed data. Thus, selecting a smaller subset of the sensor data can be highly desirable. This can be done by identifying specific instances in the data that are critical to characterization and focusing on those portions of data.

The indicative subsets of data can be identified by analyzing the statistical distributions of the various sensor parameters in the presence and absence of fuel system anomalies. Depending on the different type of fuel system anomalies, the engine speed during the startup could be accelerated faster or slower than the normal and the temperature also could rise faster or slower than the normal operation. Thus the mean and standard deviation of indicative subset of data would be much different in the presence of fuel supply system anomalies compared to those of the data in the absence of the anomalies. When identified these subsets of data can be collected and used for fault detection in the fuel system.

An examination of the distribution of the past sensor data has shown that nine parameters are particularly indicative of anomaly in the HMA of the fuel system. This subset of sensor data provides the ability for effective fault detection in the fuel system HMA while significantly reducing data processing requirements. Turning now to FIG. 3, a table 300 is illustrated that shows the nine parameters (each indicated by a shaded box) found to be particularly indicative of anomaly in the HMA. These nine parameters include sensor data taken at three of the six CTC conditions discussed above, including at the time of light off, time of peak EGT dot and time of start of $3^{rd}$ phase. Specifically, these nine parameters include time, engine speed (N2), temperature (EGT), engine speed rate of change (N2 dot) and temperature rate of change (EGT dot) taken at these three conditions. These nine parameters have been found to be particularly indicative of anomaly in the HMA, and can thus serve as the basis for fuel system fault detection.

Figure 4:
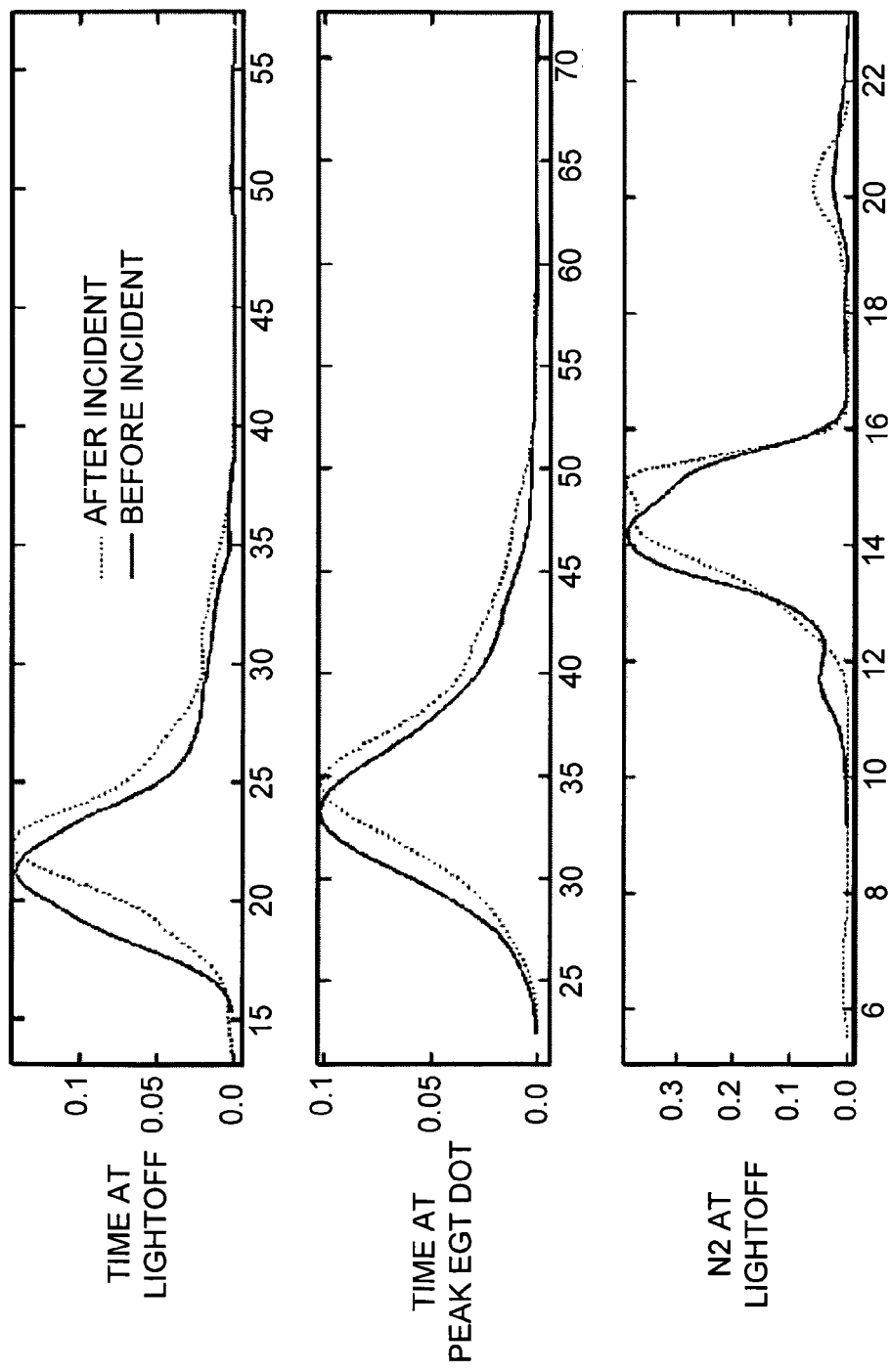
FIGS. 4-6 are graphs of exemplary sensor data from turbine engines.
Figure 5:
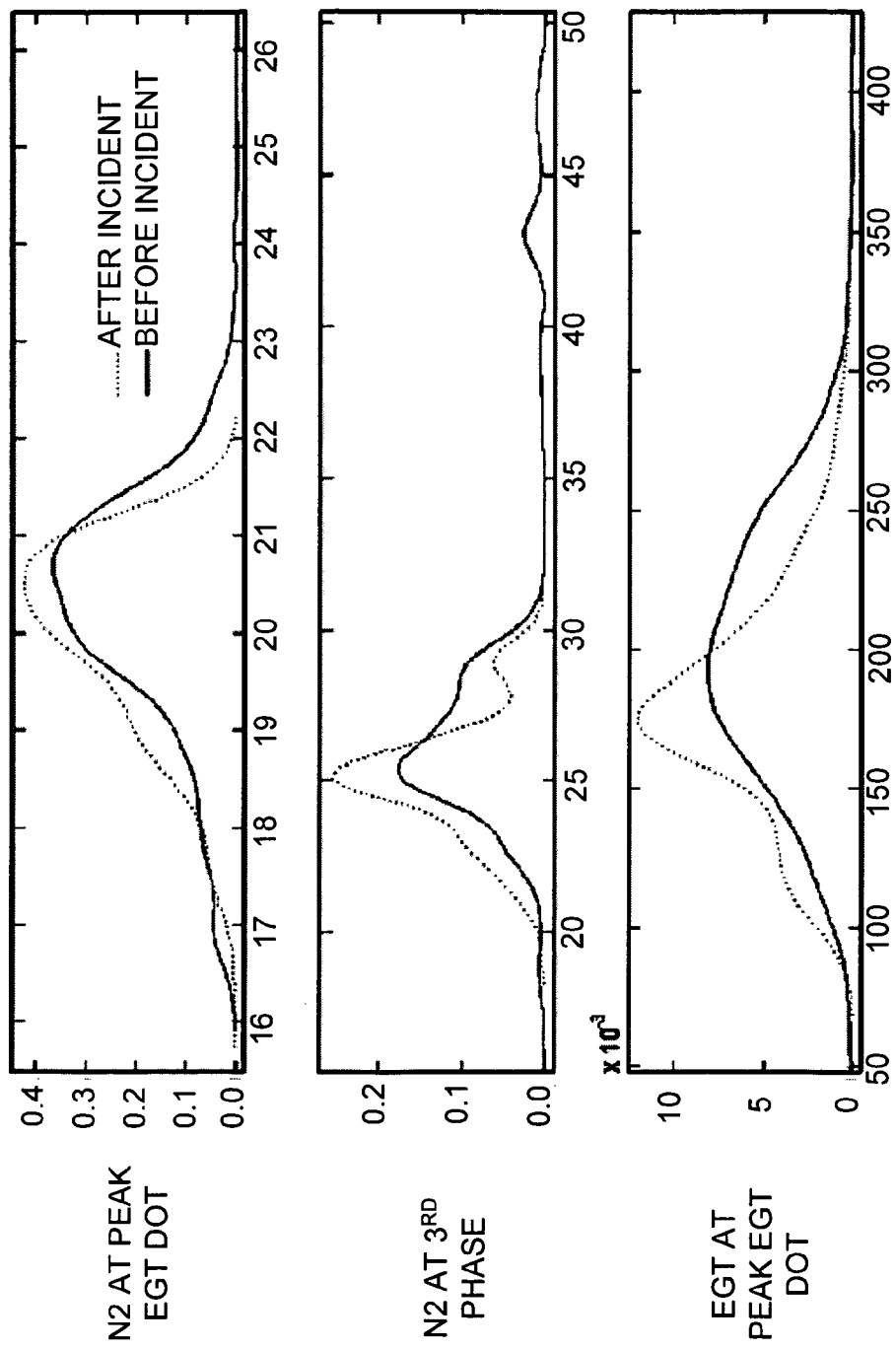
Figure 6:
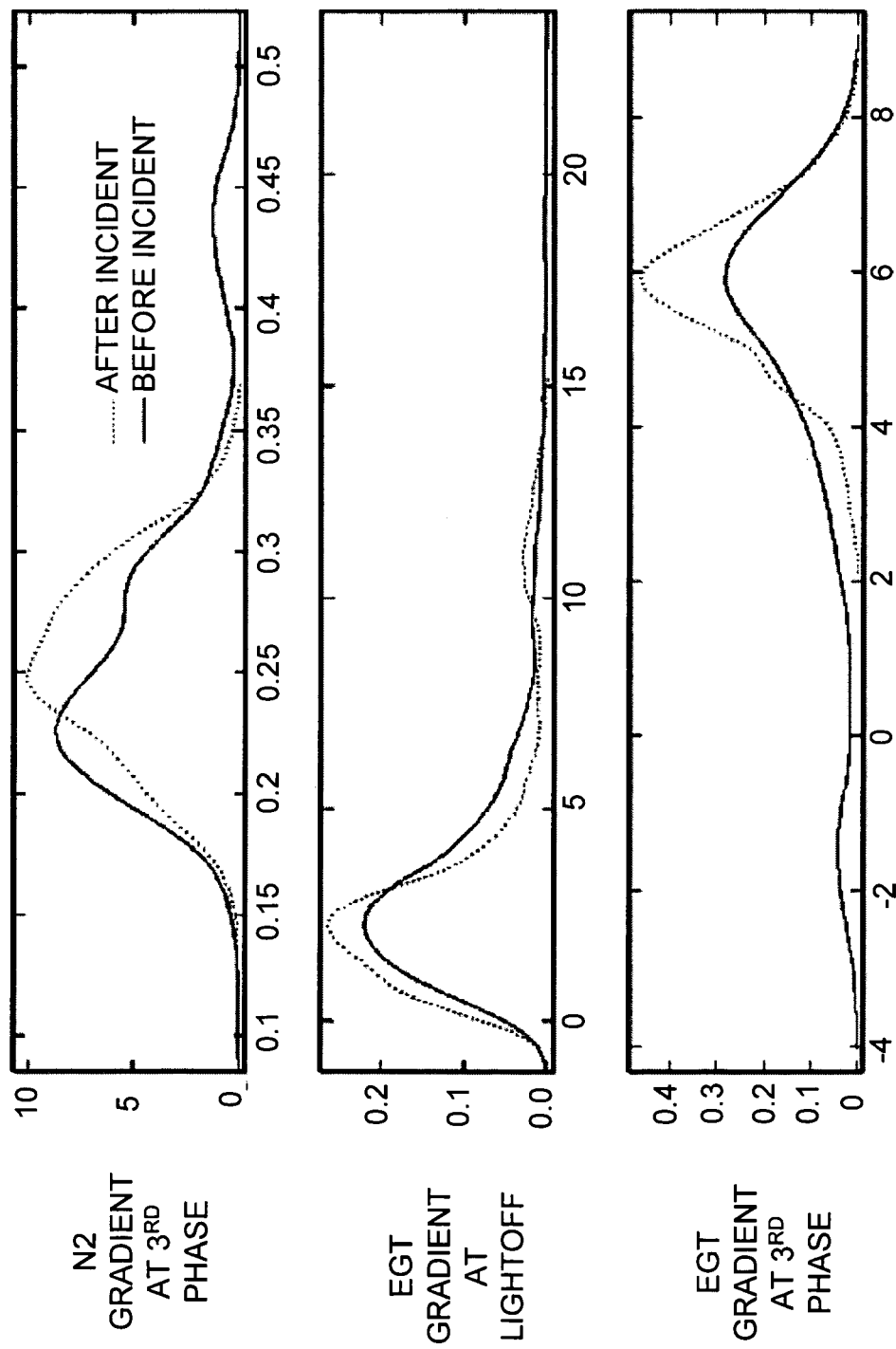

Turning now to FIGS. 4, 5 and 6, nine graphs illustrate data distributions for time at light off, time at peak EGT dot, N2 at lightoff, N2 at peak EGT dot, N2 at $3^{rd}$ phase, EGT at peak EGT dot, N2 gradient at $3^{rd}$ phase, EGT gradient at lightoff and EGT gradient at $3^{rd}$ phase. These graphs illustrate exemplary data distributions for data from a turbine for engines with a faulty HMA unit (before incident) and for engines with a new HMA unit (after incident). In the graphs the data sets recorded before the replacement of the HMA unit are illustrated with the solid line, and the data sets recorded after replacement are illustrated with a dotted line. The graphs illustrate how the distribution of these nine parameters changes in response to a faulty HMA as compared to a new HMA. Specifically, FIGS. 4, 5 and 6 show that the distribution of the data obtained from a faulty HMA unit (before the incident) shows the longer tails in the upper limit compared to the that of data obtained from a normal HMA unit (after the incident) for the parameters of time at light off, time at peak EGT dot, N2 at light off, N2 at peak EGT dot, N2 at $3^{rd}$ phase, EGT at peak EGT dot, N2 gradient at $3^{rd}$ phase, and EGT gradient at light off. FIG. 6 also shows that distribution of the data obtained from a faulty HMA unit (before the incident) shows the longer tails in the lower limit compared to the that of data obtained from a normal HMA unit (after the incident) for the parameter of EGT gradient at $3^{rd}$ phase. Thus, these nine parameters are highly indicative of HMA anomalies and are preferably used for fault detection.

During operation of the fault detection system these nine parameters are passed to the fault detection system as sensor data. Typically this sensor data would be collected and stored for each startup of the turbine engine and then passed to the fault detection system at appropriate times. In some embodiments the data from each new start would be sent to the fault detection system individually. In other embodiments data from a set of starts would be collected and sent to the fault detection system as one batch of data. In either case the sensor data is collected and sent to the fault detection system where it is used for diagnosis and prognosis of the HMA.

In one particular embodiment these nine parameters are passed to a PCA feature extractor. The PCA extracts salient features from the selected sensor data and outputs a reduced number of variables, called principal components, which describe the salient features of the underlying data.

Figure 7:
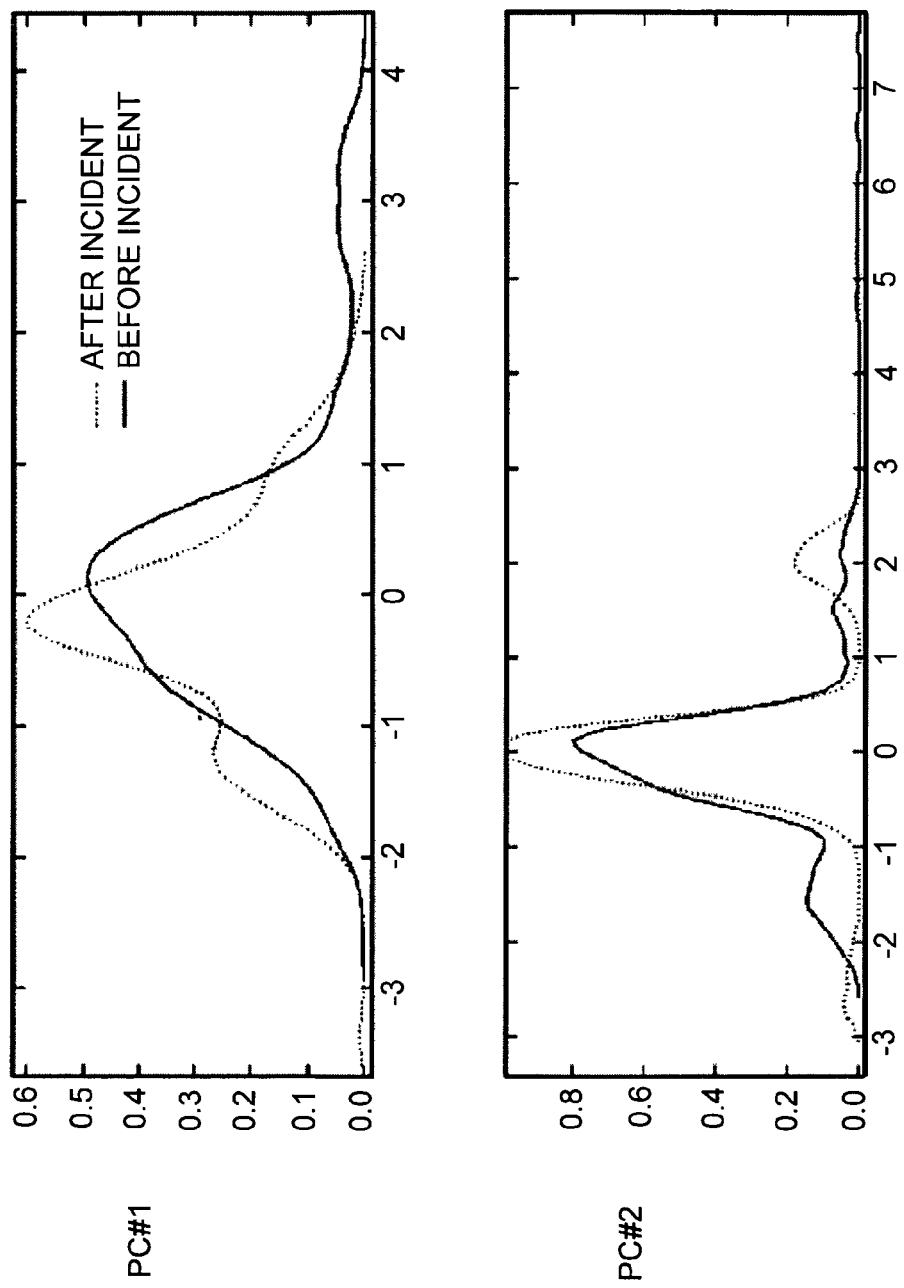
FIGS. 7-8 are graphs of exemplary principal components derived from sensor data from turbine engines.
Figure 8:
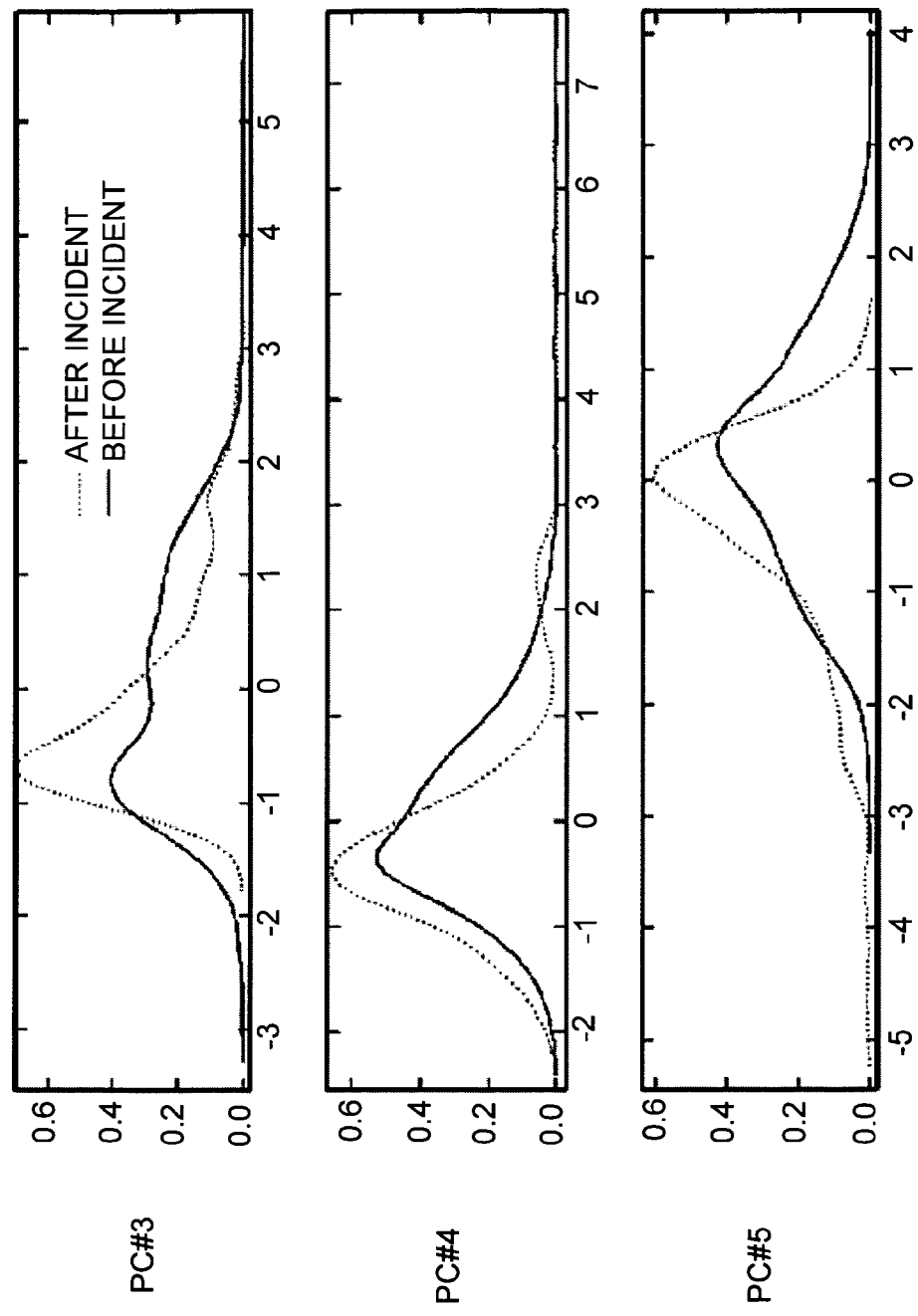

As one specific example PCA is applied to the nine parameters and among the principal components produced from the nine parameters five principle components are selected that are identified as showing distinguishable indications and are suitable for a fuzzy clustering analysis. Turning now to FIGS. 7 and 8, five graphs illustrate data distributions for five exemplary principal components derived from the nine parameters illustrated in FIGS. 4, 5 and 6. Thus, these graphs illustrate principal component distributions for engines with a faulty HMA unit and for engines with a new HMA unit. Again, the principal components derived from data collected before the replacement of the HMA unit are illustrated with the solid line, and the principal components derived from data collected after replacement are illustrated with a dotted line.

In this exemplary implementation the principal components are passed to a classifier that uses fuzzy clustering. As described above, fuzzy clustering identifies natural groupings of data from a large data set to produce a more concise representation of system behavior. When used for classification, fuzzy clustering assigns each data point to a cluster to some degree that is specified by a membership grade.

On method of building a fuzzy clustering system is to use train the system using exposure to real-time or historical data. When so trained the fuzzy clustering system is ready to classify new data sets into clusters by membership grade. Thus, as new data sets from the feature extractor are received the classifier assigns each new data set to a cluster to a degree that is specified by a membership grade. From this classification the system is able to determine if the data set is indicative of future or current-failure in the fuel system of the turbine engine.

Figure 9:
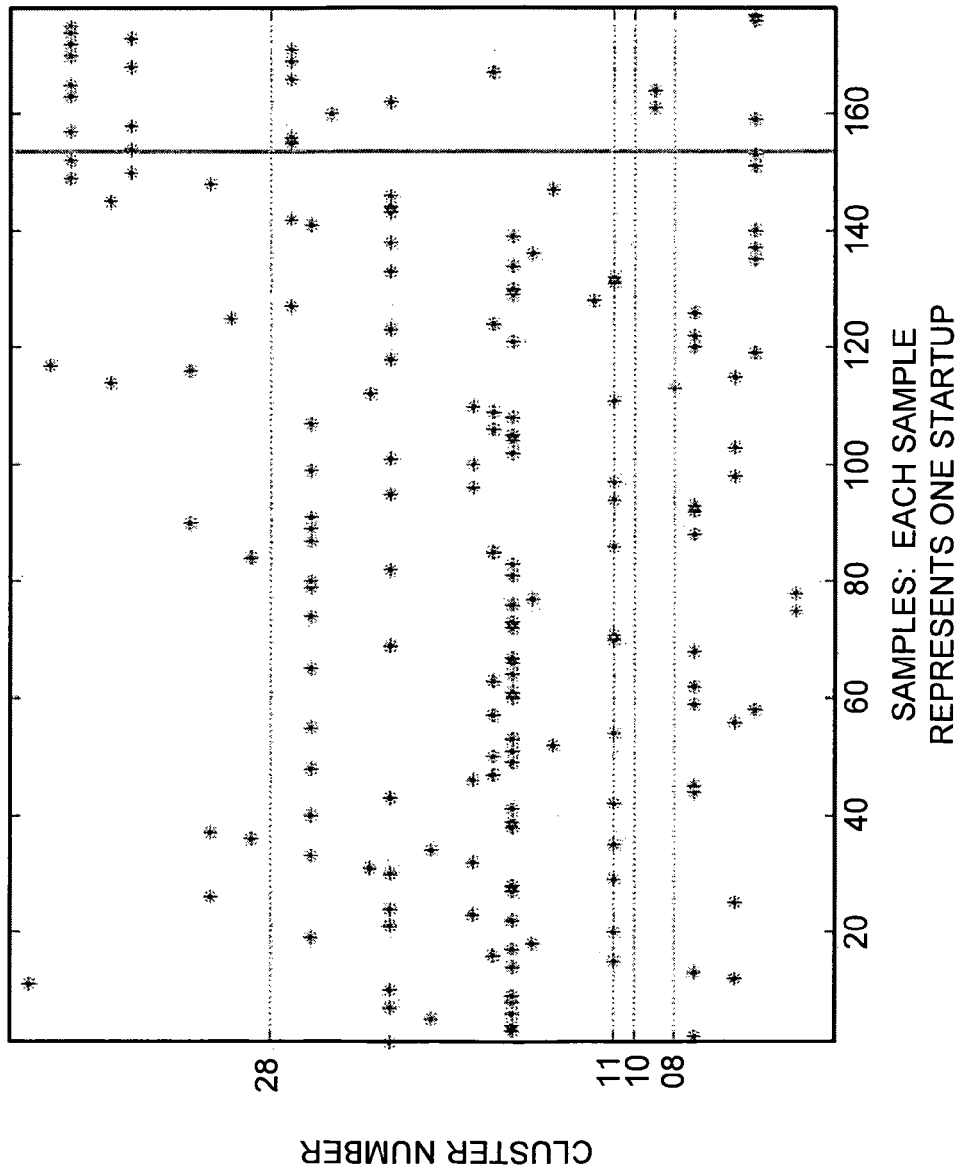
FIG. 9 is a graph of the results of an exemplary fuzzy clustering analysis.

Turning now to FIG. 9, a graph 900 illustrates the results of an exemplary fizzy clustering analysis. In this example the fuzzy clustering system was obtained by training with sensor data from six known HMA related incidents. This produced a total of 40 clusters, with clusters 8, 10, 11 and 28 determined to be representing HMA anomalies. These clusters can be identified during training. Again during training historical data is used from both normal and abnormal HMA units. Clusters that are formed from the data from abnormal HMA units but are not formed from the data from normal HMA units are indicative of HMA failure and can thus used to identify HMA anomalies.

Graph 900 illustrates exemplary sensor data from over 160 engine starts that was subjected to a PCA feature extraction and classified by comparing to the 40 clusters. In the illustrates example, data sets from 14 engine starts are members of cluster 11, and are thus indicative of an HMA anomaly. After start 150 the HMA was replaced, as indicated by the vertical line in graph 800. After the replacement of the HMA no future starts resulted in membership in clusters 8, 10, 11 or 28, verifying that replacement of the HMA eliminated the anomalies. It should be noted that engine starts resulted cluster 11 membership well before the HMA was replaced. Thus, using this method the HMA anomaly was apparent well before the HMA was replaced. This illustrates the ability of this procedure to detect the presence of anomalies in the HMA before they become critical.

The fuel system fault detection system and method can be implemented in wide variety of platforms. Turning now to FIG. 11, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a fuel system fault detection program.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 11, storage device 190 can comprise a disc drive device that uses discs 195 to store data.

In accordance with the preferred embodiments of the invention, the computer system 50 includes the fuel system fault detection program. Specifically during operation, the fuel system fault detection program is stored in memory 180 and executed by processor 110. When being executed by the processor 110, the fuel system fault detection system monitors turbine engine sensor data to identify potential faults in the fuel system. This can then be used by a technician or other user to interact with the system in order to arrive at proper diagnostic and prognostics.

As one example implementation, the trending system can operate on data that is acquired from a turbine engine and periodically uploaded to an internet website. The fuel system fault detection is performed by the web site and the results are returned back to the technician or other user. Thus, the system can be implemented as part of a web-based diagnostic and prognostic system.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

The present invention thus provides a fault detection system and method that provides improved fault detection. The fault detection system provides the ability to detect symptoms of fault in the fuel system of a turbine engine. The fault detection system captures selected data from the turbine engines that is used to characterize the performance of the fuel system. The fault detection system includes a feature extractor that extracts salient features from the selected sensor data. The extracted salient features are passed to a classifier that analyzes the extracted salient features to determine if a fault is occurring or has occurred in the turbine engine fuel system. Detected faults can then be passed to a diagnostic system where they can be passed as appropriate to maintenance personnel.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A fault detection system for detecting faults in a turbine engine fuel system, the fault detection system comprising:
    a sensor data processor, the sensor data processor configured to receive sensor data from the turbine engine and select a subset of sensor data, the subset of sensor data including time at lightoff, time at peak engine temperature rate of change, engine speed at lightoff time, engine speed at peak engine temperature rate of change time, engine speed at $3^{rd}$ phase time, engine temperature at time of peak engine temperature rate of change, engine speed rate of change at $3^{rd}$ phase time, engine temperature rate of change at lightoff time and engine temperature rate of change at $3^{rd}$ phase time;
    a feature extractor, the feature extractor configured to receive the subset of sensor data and generate principal components from the time at lightoff, the time at peak engine temperature rate of change, the engine speed at lightoff time, the engine speed at time of peak engine temperature rate of change, the engine speed at $3^{rd}$ phase time, the engine temperature at peak engine temperature rate of change time, the engine speed rate of change at $3^{rd}$ phase time, the engine temperature rate of change at light off time and the engine temperature rate of change at $3^{rd}$ phase time; and
    a classifier, the classifier configured to receive the generated principal components and classify the principal components to determine if a fault occurred in the turbine engine fuel system.

2. The system of claim 1 wherein the classifier comprises a clustering system, the clustering system configured to classify the generated principal components into one of a plurality of clusters.

3. The system of claim 2 wherein the clustering system comprises a fuzzy clustering system, and wherein the fuzzy clustering system is trained using historical sensor data including historical sensor data obtained from turbine engines with good fuel system components and historical sensor data obtained from turbine engines with faulty fuel system components.

4. The system of claim 1 wherein the feature extractor is configured to perform a principal component analysis to generate the principal components, and wherein the classifier is configured to classify using less than nine principal components.

5. The system of claim 1 wherein the classifier is trained to determine if a fault occurred in a hydra-mechanical assembly of the turbine engine fuel system.

6. A fault detection system for detecting faults in a turbine engine fuel system, the fault detection system comprising:
    a principal component analysis (PCA) feature extractor, the PCA feature extractor configured to receive sensor data from the turbine engine, the PCA feature extractor configured to derive a plurality of principal components from the sensor data, where the sensor data includes time at lightoff, time at peak engine temperature rate of change, engine speed at lightoff time engine speed at peak engine temperature rate of change time, engine speed at $3^{rd}$ phase time, engine temperature at peak engine temperature rate of change time, engine speed rate of change at $3^{rd}$ phase time, engine temperature rate of change at lightoff time and engine temperature rate of change at $3^{rd}$ phase time; and a fuzzy clustering classifier, the frizzy clustering classifier configured to receive the plurality of principal components and classify the plurality of principal components into one of a plurality of clusters to determine if a fault occurred in the turbine engine fuel system.

7. The system of claim 6 wherein the fuzzy clustering classifier is trained using historical sensor data including historical sensor data obtained from turbine engines with good hydro-mechanical assemblies and historical sensor data obtained from turbine engines with faulty hydro-mechanical assemblies.

8. The system of claim 6 wherein the plurality of principal components comprises five principal components generated from the sensor data, and wherein the five principal components are selected based on statistical distributions of principal components generated from historical sensor data in the presence and absence of hydro-mechanical assembly anomalies.

9. The system of claim 6 wherein the sensor data comprises a selected set of sensor data, the selected set of sensor selected based on statistical distributions of historical sensor data in the presence and absence of hydro-mechanical assembly anomalies.

10. The system of claim 9 wherein the historical sensor data is standardized for ambient conditions.

11. The system of claim 9 wherein the historical sensor data is filtered based on power level angle profiles of the turbine engines.

12. The system of claim 9 wherein the historical sensor data includes only historical data from normal auto mode startups of the turbine engines.

13. An apparatus comprising:
a) a processor;
b) a memory coupled to the processor;
c) a fuel system fault detection program for detecting faults in a turbine engine fuel system, the fuel system fault detection program residing in the memory and being executed by the processor, the fuel system fault detection program including:
i) a principal component analysis (PCA) feature extractor, the PCA feature extractor configured to receive sensor data from the turbine engine, the PCA feature extractor configured to derive a plurality of principal components from the sensor data, where the sensor data includes time at lightoff, time at peak engine temperature rate of change, engine speed at lightoff time, engine speed at time of peak engine temperature rate of change, engine speed at $3^{rd}$ phase time, engine temperature at peak engine temperature rate of change-time, engine speed rate of change at $3^{rd}$ phase time, engine temperature rate of change at lightoff time and engine temperature rate of change at $3^{rd}$ phase time; and
ii) a fuzzy clustering classifier, the fuzzy clustering classifier configured to receive the plurality of principal components and classify classifying the plurality of principal components into one of a plurality of clusters to determine if a fault occurred in the turbine engine fuel system.

* * * * *

UNITED STATES PATENT AND TRADEMARK OFFICE
CERTIFICATE OF CORRECTION

| | | |
|---|---|---|
| PATENT NO. | : 7,693,643 B2 | Page 1 of 1 |
| APPLICATION NO. | : 11/058061 | |
| DATED | : April 6, 2010 | |
| INVENTOR(S) | : Kyusung Kim et al. | |

It is certified that error appears in the above-identified patent and that said Letters Patent is hereby corrected as shown below:

Column 13, line 12 claim 6, "frizzy" should be changed to --fuzzy--.

Signed and Sealed this

Thirteenth Day of July, 2010

David J. Kappos
*Director of the United States Patent and Trademark Office*